Patented Jan. 3, 1950

2,493,637

UNITED STATES PATENT OFFICE 2,493,637

PROCESS FOR THE PREPARATION OF ALIPHATIC NITRILES

Warren D. Niederhauser, Philadelphia, Pa., assignor to Rohm & Haas Company, Philadelphia, Pa., a corporation of Delaware No Drawing. Application May 1, 1948, Serial No. 24,686

5 Claims. (Cl. 260—465.2)

This invention relates to a catalytic process for the preparation of aliphatic nitriles in general and of oleonitrile in particular. It relates to an improved process wherein aliphatic acids, and particularly oleic acid, react rapidly with ammonia under the influence of a cobalt catalyst at lower temperatures than have been practicable heretofore.

An object of this invention is to provide a process for preparing aliphatic nitriles which avoids the high temperatures which were required formerly. Another object is to reduce or eliminate the volatilization of the fatty acid during its reaction with ammonia. Still another object is to prevent dimerization of the nitrile and/or the formation of by-products by the partial decomposition of the reactant or product. A more specific object is to prepare oleonitrile at such low temperatures that costly and cumbersome equipment is not necessary. In short, the object is to produce fatty acid nitriles, particularly oleonitrile, more economically and more efficiently than is possible by older methods.

Aliphatic nitriles are made by two general and well-known methods. In one such method, ammonia and an aliphatic acid are reacted in the vapor phase, usually in the presence of a dehydrating catalyst such as alumina or silica gel. Such a catalyzed, vapor-phase process is described, for example, in United States Patents Nos. 2,205,076 and 2,177,619. The other process involves the reaction of the fatty acid and ammonia in the liquid phase and is described in United States Patent No. 2,061,314 to Ralston et al. This last patent also indicates the advantages of the liquid-phase process over the vapor-phase process.

The present invention may be considered an improvement in the liquid-phase process in that lower temperatures and more simple equipment are employed.

The improvement referred to resides in the use of a catalyst—a cobalt salt of a carboxylic acid—during the reaction of ammonia and liquid fatty acid. The cobalt catalyst accelerates the reaction at relatively low temperatures, and those disadvantages are thereby avoided which, from chemical and engineering standpoints, attend the use of high temperatures.

A catalytic amount of the cobalt salt is mixed with or dissolved in the liquid fatty acid, and ammonia is then reacted with the fatty acid. Water of reaction is driven off, and the resultant fatty acid nitrile is separated, for example, by distillation under reduced pressure, from the catalyst, which may be reused.

It is preferred that the nitrile be prepared batchwise, but this process is readily adaptable to continuous operation.

The catalyst which is employed is a cobalt salt of a carboxylic acid, preferably a cobalt salt of an aliphatic acid. The cobalt salts of aliphatic acids containing ten to twenty-two carbon atoms and having no functional group other than the carboxyl group are particularly useful because they are stable and may be used repeatedly. Examples of suitable cobalt salts are those of acetic, valeric, capric, lauric, myristic, palmitic, stearic, arachidic, and behenic acids. Cobalt salts of mixed acids are also operable, as, for example, cobalt naphthenate, which is the cobalt salt of a mixture of acids, predominantly alicyclic acids, obtained from naphthenic crude oils. In practice, it is preferred that the cobalt salt of the particular fatty acid which is being converted to a nitrile be employed because such a salt can be prepared during the period of heating by reaction of the acid with, for example, cobalt oxide, hydroxide, or salt of a more volatile inorganic or organic acid. Thus, for example, in the conversion of oleic acid to oleonitrile, cobalt oleate per se may be employed or cobalt oleate may be formed in situ by the reaction of the oleic acid and cobalt acetate or carbonate or the cobalt salt of a more volatile carboxylic acid. The more volatile acid, formerly combined as a cobalt salt, is liberated and the cobalt salt of the oleic acid is formed.

The cobalt catalyst is used in an amount equivalent to 0.1% to 1.0% of metallic cobalt, based on the starting amount of the fatty acid which is to be converted to the corresponding nitrile. Much larger amounts of cobalt salt can be used so long as the mixture of acid and cobalt salt catalyst is liquid at the temperature of reaction. However, there does not appear to be a real advantage in using more than 1%. When more than this amount of cobalt is used in the form of a salt of a lower fatty acid, it reacts with the higher fatty acid present and thereby reduces the yield of nitrile. For example, if cobalt acetate should be used in an amount equivalent to 10% of cobalt based on the fatty acid to be converted, this amount would first react with the fatty acid, liberate acetic acid, and form the cobalt salt of the fatty acid. The salt thus formed would serve as a catalyst but would be all out of proportion to the amount required for catalysis and would, of necessity, tie up a substantial part of the fatty acid and thus reduce the yield of nitrile. Less than 0.1% of cobalt in the form of a salt is relatively ineffective.

The presence of the cobalt catalyst so accelerates the reaction between the fatty acid and the ammonia that the reaction may be completed in the same time at a temperature forty to seventy degrees lower than that which is ordinarily required in the absence of the catalyst. Alternatively, at a given temperature, the time required for completion of the reaction may be reduced by as much as three quarters through the use of a catalyst. For example, when oleic acid is reacted with ammonia in the absence of a catalyst, a temperature of about 320°–330° C. is required for rapid conversion. In the presence of 0.2% to 0.4% of cobalt, as cobalt oleate, the reaction proceeds just as rapidly at 260° to 270° C. Or, conversely, the time required to complete the reaction at 260° to 270° C. in the absence of the catalyst is three to four times that required when the catalyst is present.

While the acid and ammonia react in equimolecular proportions, it is much preferred that an excess of ammonia be employed. Thus, one and one-half to ten moles of ammonia, or preferably two to three moles, is employed per mole of fatty acid. The excess ammonia may be recovered and/or recycled.

This catalytic process is particularly useful in the preparation of oleonitrile, as the following examples illustrate:

Example 1

Five hundred parts of oleic acid and 7.4 parts of cobalt acetate, $Co(C_2H_3O_2)_2 \cdot 4H_2O$ (equivalent to 0.35% of cobalt based on the oleic acid) were charged to a three-necked flask equipped with mechanical stirrer, thermometer, and steam-heated reflux condenser. The mixture was stirred and heated to 200° C., during which time acetic acid distilled out of the reaction mixture. Ammonia was then passed into the mixture at a point below the stirrer at the rate of seventeen parts per hour while the temperature of the reaction mixture was raised rapidly to 270° C. Ammonia was admitted for a period of six hours while stirring was continued and the temperature was maintained at 270° C. The reaction mixture was then distilled at 170°–190° C. at a pressure of 4 mm. The product, obtained in quantitative yield, was water-white oleonitrile having an acid number of about 0.5. A portion cooled to 0° C. remained clear. This last test is a measure of purity, since a sample of oleonitrile containing as little as 1% of oleamide and/or ammonium oleate becomes turbid at 0° C. The residue after distillation of the oleonitrile was cobalt oleate, which was employed successfully as catalyst in the preparation of subsequent batches of oleonitrile by the reaction of oleic acid and ammonia at 260°–270° C. in the manner described above.

Example 2

In a similar manner, with the same equipment and procedural steps, five hundred parts of oleic acid was reacted with an excess of ammonia in the presence of twenty parts of cobalt naphthenate (containing 6% of cobalt and equivalent to 0.24% of cobalt based on the oleic acid). A quantitative yield was obtained, as in Example 1, after six hours of heating at 270° C. The product remained clear when cooled to 0° C.

In contrast to the results obtained above, it is important to note that oleic acid and ammonia reacted only to the extent of about 75% at 270° C. in the absence of a catalyst. Furthermore, the yield of oleonitrile was only 95% after twenty-one hours of uncatalyzed reaction at 270° C. The product of the uncatalyzed reaction was turbid on cooling due to the presence of oleamide and ammonium oleate.

It is apparent from the above that, when a cobalt catalyst is used, quantitative yields of oleonitrile are obtained in but a fraction of the time required under the same conditions in the absence of a catalyst. Furthermore, the quantitative and rapid conversion of the acid to the nitrile in the presence of the cobalt catalyst eliminates the need of removing intermediate compounds such as the ammonium salt or amide. In preparing oleonitrile, temperatures from 250° C. to 290° C., but preferably from 260° C. to 270° C., are used.

This invention has been described for the most part in regard to the preparation of oleonitrile. It relates also to the preparation of nitriles of carboxylic acids in general. It is particularly valuable in the production of the nitriles of those aliphatic carboxylic acids which boil above about 200° C. at atmospheric pressure and of those acids from animal and vegetable oils which decompose or polymerize at high temperatures. Acids which can be converted to nitriles advantageously by the process of this invention include those having ten to about twenty-two carbon atoms, such as capric, lauric, myristic, palmitic, stearic, arachidic, behenic, linoleic, and the like.

I claim:

1. The process of preparing oleonitrile which comprises reacting ammonia and oleic acid in the liquid phase at a temperature from 250° C. to 290° C. in the presence of a cobalt salt of a carboxylic acid having ten to twenty-two carbon atoms, said salt being present in an amount equivalent to at least 0.1% cobalt based on the original weight of said oleic acid.

2. The process of preparing oleonitrile which comprises reacting ammonia and oleic acid at a temperature from 250° C. to 290° C. in the presence of a cobalt salt of a carboxylic acid having ten to twenty-two carbon atoms, said salt being present in an amount equivalent to 0.1% to 1.0% of cobalt based on the original weight of said oleic acid.

3. The process of preparing oleonitrile which comprises reacting ammonia and oleic acid at a temperature from 250° C. to 290° C. in the presence of cobalt oleate in an amount equivalent to 0.1% to 1.0% of cobalt based on the original weight of the oleic acid.

4. The process of preparing oleonitrile which comprises reacting ammonia and oleic acid at a temperature from 260° C. to 270° C. in the presence of a cobalt salt of a carboxylic acid having ten to twenty-two carbon atoms, said salt being present in an amount equivalent to 0.1% to 1.0% of cobalt based on the original weight of said oleic acid.

5. The process of preparing oleonitrile which comprises reacting ammonia and oleic acid at a temperature from 260° C. to 270° C. in the presence of cobalt oleate in an amount equivalent to 0.1% to 1.0% of cobalt based on the original weight of the oleic acid.

WARREN D. NIEDERHAUSER.

REFERENCES CITED

The following references are of record in the file of this patent:

UNITED STATES PATENTS

| Number | Name | Date |
| --- | --- | --- |
| 2,061,314 | Ralston et al. | Nov. 17, 1936 |
| 2,144,340 | Lazier | Jan. 17, 1939 |
| 2,177,619 | Nicodemus | Oct. 24, 1939 |
| 2,205,076 | Wortz | June 18, 1940 |
| 2,444,828 | Kaplan | July 6, 1948 |
| 2,460,772 | Stegemeyer | Feb. 1, 1949 |